US008617500B2

(12) United States Patent
Gartner et al.

(10) Patent No.: US 8,617,500 B2
(45) Date of Patent: Dec. 31, 2013

(54) PROCESS FOR REMOVAL OF CARBON DIOXIDE FROM A GAS STREAM

(75) Inventors: Ellis Gartner, Lyons (FR); Michel Gimenez, Diemoz (FR); Maurice Paliard, Lyons (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 13/512,388

(22) PCT Filed: Nov. 22, 2010

(86) PCT No.: PCT/EP2010/067933
§ 371 (c)(1),
(2), (4) Date: Jun. 7, 2012

(87) PCT Pub. No.: WO2011/076502
PCT Pub. Date: Jun. 30, 2011

(65) Prior Publication Data
US 2012/0238006 A1    Sep. 20, 2012

(30) Foreign Application Priority Data

Nov. 30, 2009  (EP) .................................... 09356059

(51) Int. Cl.
*C01B 31/20*          (2006.01)
(52) U.S. Cl.
USPC ........................................................ 423/230
(58) Field of Classification Search
USPC ........................................................ 423/230
See application file for complete search history.

(56) References Cited

U.S. PATENT DOCUMENTS

| 6,387,337 | B1* | 5/2002 | Pennline et al. | 423/220 |
| 6,387,845 | B1* | 5/2002 | Masahiro et al. | 502/407 |
| 2009/0202410 | A1* | 8/2009 | Kawatra et al. | 423/232 |
| 2010/0021362 | A1* | 1/2010 | Hunwick | 423/230 |
| 2010/0092359 | A1* | 4/2010 | Svendsen et al. | 423/230 |
| 2010/0196235 | A1* | 8/2010 | Geerlings et al. | 423/232 |

FOREIGN PATENT DOCUMENTS

WO    WO 2008/072979 A1    6/2008

OTHER PUBLICATIONS

International Search Report for PCT/EP2010/067933.

* cited by examiner

*Primary Examiner* — Ralph Gitomer
(74) *Attorney, Agent, or Firm* — Pillsbury Winthrop Shaw Pittman LLP

(57) ABSTRACT

A process for reducing the carbon dioxide concentration of a carbon dioxide-containing gas which process includes, in a first stage, contacting the carbon dioxide-containing gas with a treating solution including an alkali metal carbonate and/or hydroxide and with a catalyst to promote the absorption of carbon dioxide to form a second solution including an alkali metal carbonate and bicarbonate and, in a second stage, contacting the second solution with a carbonatable silicate-containing material including an alkaline earth cation capable of forming an insoluble carbonate to produce silica and a solid carbonate including the cation and to regenerate a solution including alkali metal carbonate.

10 Claims, No Drawings

PROCESS FOR REMOVAL OF CARBON DIOXIDE FROM A GAS STREAM

CROSS-REFERENCE TO RELATED APPLICATIONS

This is the U.S. National Stage of PCT/EP2010/067933, filed Nov. 22, 2010, which in turn claims priority to European Patent Application No. 09356059.7, filed Nov. 30, 2009, the entire contents of both applications are incorporated herein by reference in their entireties.

This invention relates to a process for reducing the concentration of carbon dioxide in a carbon dioxide-containing gas.

Many industrial processes, including the manufacture of cement, generate substantial quantities of carbon dioxide which is emitted in flue gases. Carbon dioxide is recognised as a "greenhouse gas" which contributes to global warming. It is therefore desirable to reduce the amount of carbon dioxide released into the atmosphere.

One way of reducing the industrial emission of carbon dioxide is to treat flue gases containing it, before they are released into the atmosphere, in order to trap carbon dioxide. It can, in principle, be trapped as a stable alkaline earth metal carbonate using a solid carbonatable material comprising the alkaline earth metal. However the direct carbonation of such a material using carbon dioxide may be extremely slow at the temperature and pressure of a typical flue gas even though such carbonation is usually thermodynamically favourable. Flue gas generally has a temperature less than about 200° C. and a pressure of about one atmosphere, and often also has a high content of water vapour.

In order to capture a significant fraction of cement plant carbon dioxide emissions in a processing unit of a reasonable dimension and cost, it is necessary to have an efficient gas-scrubbing system which can rapidly remove carbon dioxide. One way of storing the captured carbon dioxide in a stable form is to convert it into a stable mineral carbonate, for example an alkaline earth metal carbonate (such as a form of calcium carbonate, magnesium carbonate or a mixed calcium/magnesium carbonate).

It is known that alkali metal carbonates in aqueous solution react with carbon dioxide to form solutions comprising bicarbonate ions. The reactions involved can be described by the following equations.

1 Dissociation of alkali metal carbonate in water to give an ionic solution:

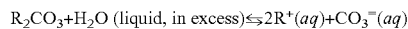

wherein R represents an alkali metal.

2 Solvation of carbon dioxide gas:

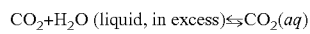

3 Equilibration of solvated $CO_2$ with carbonic acid:

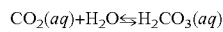

4 Equilibration of carbonate and bicarbonate:

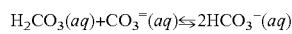

From the equilibria expressed by equations 2, 3 and 4 it can be shown that the partial pressure of $CO_2$ gas in equilibrium with the solution at any given temperature should vary in approximate proportion to the aqueous ionic activity ratio $\{(HCO_3^-)^2/(CO_3^=)\}$, and that the effective capacity of the initial alkali carbonate solution to dissolve carbon dioxide gas increases in approximate proportion to the dissolved alkali metal concentration assuming that no other dissolved ions than those shown above are present in significant amounts.

Under the operating conditions of most interest for gas scrubbing, i.e. at close to atmospheric pressure and at temperatures of, for example, 10° to 80° C., generally 10° to 70° C., the use of concentrated alkali carbonate solutions as the scrubbing liquid can increase the effective solubility of carbon dioxide in water by as much as two orders of magnitude compared to the use of pure water.

In the event that the alkali carbonate solution used to dissolve carbon dioxide gas also contains significant concentrations of hydroxide ions, which further increase its alkalinity and thus its ability to dissolve carbon dioxide gas, reaction (5) will tend to occur in preference to reaction (4) until all of the hydroxide ions have been used up, after which reaction (4) will again predominate, as above:

5 Equilibration of hydroxide and carbonate:

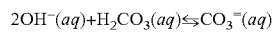

The present invention relates to a process comprising two stages which can accommodate different reaction rates of carbon dioxide capture and its subsequent entrapment in a stable carbonate by scaling the two stages individually as required. The process of the invention also seeks to facilitate the absorption of carbon dioxide by a carbonate-containing solution, for example by accelerating the rate of absorption by the use of a catalyst.

The invention accordingly provides a process for reducing the carbon dioxide concentration of a carbon dioxide-containing gas (preferably a flue gas, more preferably a cement plant flue gas) which process comprises, in a first stage, contacting the carbon dioxide-containing gas with a treating solution comprising an alkali metal carbonate and/or hydroxide and with a catalyst to promote the absorption of carbon dioxide to form a second solution comprising an alkali metal carbonate and bicarbonate and, in a further stage, contacting the second solution with a carbonatable silicate-containing material comprising an alkaline earth cation capable of forming an insoluble carbonate to produce silica and a solid carbonate comprising the cation and thus to regenerate a solution comprising alkali metal carbonate.

The alkali metal is preferably sodium or potassium.

The cation capable of forming an insoluble carbonate is generally an alkaline earth metal, preferably magnesium or calcium. The source of the alkaline earth metal for such a process should preferably be an inexpensive carbonatable compound, for example a calcium and/or magnesium mineral or industrial by-product material with sufficient inherent alkalinity to be capable of being carbonated by the flue gases.

The term "insoluble" as used in this specification and the accompanying claims refers to a material which precipitates from solution under the conditions prevailing in the process of the invention.

The carbonatable silicate-containing material is generally a calcium and/or magnesium silicate-containing mineral or an industrial silicate-containing material. The minerals include ultra-basic rocks, e.g. olivines, serpentines and talcs (comprising basic magnesium silicates), as well as, for example, chlorite, diopside, enstatite, monticellite and wollastonite. The industrial silicate-containing materials include calcium-containing coal combustion ashes and metallurgical slags (comprising basic calcium silicates and optionally aluminates).

The reactivity of the carbonatable silicate-containing material may be increased by grinding and/or heating.

The treating solution comprises an alkali metal carbonate, hydroxide or a mixture thereof A treating solution comprising alkali metal carbonate or alkali metal carbonate and hydroxide is preferably used. A treating solution comprising alkali metal hydroxide, if used, would generally be employed only at the start up of the process of the invention.

When an alkali metal carbonate is present the treating solution generally comprises 2 to 40%, preferably 3 to 20%, more preferably 4 to 12%, for example about 5% w/w of alkali metal carbonate. Alkali metal carbonates exist in a variety of hydrated forms. In this specification, including the accompanying claims, percentages are expressed in terms of anhydrous material.

When an alkali metal hydroxide is used, for example at the start up of the process of the invention, in addition to alkali metal carbonate, the treating solution generally comprises 0.01 to 40%, more preferably 0.1 to 10%, for example about 4% w/w of alkali metal hydroxide. In this specification, including the accompanying claims, percentages of alkali metal hydroxide are expressed in terms of anhydrous material.

The use of a solution comprising both alkali metal carbonate and hydroxide is advantageous, being more effective in dissolving carbon dioxide.

According to a further embodiment of the invention the carbon dioxide-containing gas is treated with a solution comprising an alkali metal hydroxide and an alkali metal carbonate. The alkali metal hydroxide forms, after contact with carbon dioxide-containing gas, alkali metal carbonate.

The gas to be treated generally comprises 10 to 30% of carbon dioxide. The treated gas generally comprises less than half as much carbon dioxide as the gas before treatment.

In this specification and the accompanying claims percentages of gas are by volume based on dry gas.

A surfactant may be used to reduce the surface tension of the first and/or second solutions.

An anti-foaming agent may be used to control foaming of the first and/or second solutions which might otherwise interfere with the controlled flow of these solutions in the process of the invention.

A chelating agent or a second catalyst may be used to facilitate the further reaction.

The two stages are generally carried out in separate reactors, a first reactor for the first stage and a second reactor for the further stage. The regenerated alkali metal carbonate solution from the second stage is preferably recycled for reuse in the first stage. Alkali metal hydroxide or carbonate is preferably added to the regenerated solution, for example to compensate for loss of alkali metal cations in the process of the invention.

The catalyst used in the process of the invention may be inorganic or organic. It is generally a catalyst which catalyses the formation of carbonic acid from carbon dioxide.

Examples of catalysts are: piperazine, N-2-hydroxyethylpiperazine, N-(hydroxypropyl)piperazine, diethanoltriamine, 2-{(2-aminoethyl)amino}ethanol, monoethanolamine, diethanolamine, diisopropanolamine, methylaminopropylamine, 3-aminopropanol, 2,2-dimethyl-1,3-propanediamine, 3-amino-1-cyclohexylaminopropane, diglycolamine, 2-amino-2-methylpropanol, 1-amino-2-propanol, monomethyl methanolamine, piperidine and mixtures thereof arsenite, hypochlorite, sulphite and mixtures thereof glycine, sarcosine, alanine, N-sec-butylglycine, and pipecolinic acid, and mixtures thereof.

The catalyst is preferably an enzyme, for example a zinc-containing enzyme, most preferably a carbonic anhydrase.

It is to be understood that, in this specification and the accompanying claims, the term "a carbonic anhydrase" is to be understood as embracing carbonic anhydrase and isoforms and analogues thereof which retain the ability to catalyse the interconversion of carbon dioxide and carbonic acid.

The use of a catalyst in the first stage improves the carbon dioxide absorption efficiency. This permits a reduction in the size of the reactor for the first stage with a consequential reduction in capital cost.

Carbonic anhydrase (also known as carbonic hydrolase: EC 4.2.1.1. in accordance with the recommendations of the Nomenclature Committee of the International Union of Biochemistry and Molecular Biology (NC-IUBMB)) is a globular zinc metalloenzyme of molecular weight about 30,000 Daltons. The enzyme is found in both plant and animal tissues and regulates the interconversion of carbon dioxide and carbonic acid. Its widespread occurrence reflects the importance of $CO_2$ as a key metabolite. The interconversion of carbon dioxide and carbonic acid proceeds relatively slowly at physiological pH values: carbonic anhydrases accelerate the interconversion. The reaction catalyzed by the enzyme is essentially reaction (3) given earlier:

$$CO_2(aq)+H_2O \leftrightarrows H_2CO_3(aq)$$

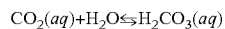

However, under the normal conditions of use, there is an immediate and very rapid equilibration between carbonic acid and bicarbonate ions in solution which is traditionally represented by the reaction given below, referred to here as reaction (6):

$$H_2CO_3(aq) \leftrightarrows H^+(aq)+HCO_3^-(aq)$$

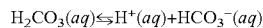

It can therefore also be stated that the catalyst or enzyme catalyses the overall process of dissociation of dissolved carbon dioxide gas to give bicarbonate ions.

It will be understood that the catalyst should be active under the conditions prevailing in the process of the invention. In particular it should be active at the high pH values existing in a solution of an alkali metal carbonate. Carbonic anhydrase is capable of catalysing both the forward reaction, (hydration of carbon dioxide) and its reverse, but it is the forward reaction which is required in the process of the invention, and which is generally thought to be the rate-limiting step in solutions of moderate pH (e.g. pH 4-11). The pH of alkali metal carbonate solutions varies with the concentration and the carbonate/bicarbonate ion ratio but is generally greater than 7.

When alkali metal hydroxide is present the pH will be raised even further, e.g. above about 11. In a preferred embodiment of the invention the carbon dioxide-containing gas is contacted with a solution comprising alkali metal carbonate and alkali metal hydroxide at high pH in the absence of catalyst and, when the hydroxide is converted to alkali metal carbonate and the carbonate forms bicarbonate and the pH of the solution is reduced, the latter solution is contacted with catalyst.

The catalyst, for example the enzyme, e.g. carbonic anhydrase, used in the process of the invention, is also preferably stable (i.e. active for a substantial period of time) at temperatures above ambient temperature, for example higher than 25° C. and generally lower than about 100° C., for example lower than about 80° C. or lower than about 70° C. The catalyst, for example the enzyme, is preferably stable at temperatures higher than about 37° C., more preferably higher than about 50° C., and even more preferably higher than about 60° C.

If necessary the carbon dioxide-containing gas may be cooled before contact with the catalyst. This cooling may be effected by indirect cooling of the gas, for example in a heat exchanger. The gas may also be cooled by contacting it with an alkali metal carbonate solution, or an alkaline earth metal carbonate suspension, which solution or suspension has a temperature lower than the gas, before contact with the catalyst. Cooling is preferred when the catalyst, e.g. enzyme, might be susceptible to inactivation at an elevated temperature.

The use of separate reactors and, in particular, of a separate reactor for contacting the carbonated solution with a carbonatable silicate-containing material comprising an alkaline earth cation capable of forming an insoluble carbonate to produce silica and a solid carbonate comprising the cation allows precipitation to be carried out in the absence of catalyst, e.g. enzyme, or in the presence of a reduced amount thereof. This is useful because the catalyst, e.g. enzyme, may be adsorbed and/or deactivated by contact with the carbonatable silicate-containing mineral used in the second reactor leading to loss of catalyst, e.g. enzyme, which must then be replenished. For this reason it is advantageous to be able to separate catalyst, e.g. enzyme, from the solution after the carbon dioxide gas has been absorbed into it but before it passes into the second reactor. Catalyst, e.g. enzyme, is preferably removed from the carbonated solution before the solution is contacted with the carbonatable silicate-containing material. The catalyst, e.g. enzyme, may be substantially completely removed or partially removed. This may be achieved in several ways, for example, by using the catalyst, e.g. enzyme: in a supported form; adsorbed or absorbed on or in a substrate; covalently bonded to a substrate when the catalyst is an enzyme; or entrapped within a carrier.

The substrate or carrier is preferably solid. Such covalent bonding, absorption, adsorption or entrapment may improve the stability of the catalyst, e.g. enzyme, in the process of the invention.

The enzyme may be bonded to a substrate that remains fixed within the first stage (gas absorption) reactor. Alternatively the enzyme may be bonded to a substrate, for example particles, generally small particles, generally suspended in the alkali carbonate solution but which can be separated, e.g. by settling or centrifugation, prior to the passage of the solution into the second reactor. Another method of separating the enzyme is to use a modified enzyme comprising attached hydrophobic chemical groups or particles which give it surface-active properties such that it concentrates at the gas-water interface, while retaining its catalytic activity in the aqueous phase. One advantage of such a "hydrophobically-modified" or "surface active" enzyme is that it can be separated from the solution by a "flotation cell" in which a gas (for example, some of the CO2-containing flue gas) is bubbled through the solution creating a foam enriched in enzyme which flows over into a collection vessel. A separate foaming agent may, if necessary, be added to the solution to facilitate this process. A second advantage of such a modified enzyme is that it also fulfils the role of a surfactant in the first stage, facilitating an increased gas/liquid contact area and thus further increasing the CO2 absorption rate.

If a substrate or carrier is used to support the catalyst, e.g. enzyme, it may be inorganic or organic. Substrates or carriers for use in the process of the invention include alumina, bentonite, biopolymers, calcium carbonate, calcium phosphate gel, carbon, cellulose, ceramic supports, clay, collagen, glass, hydroxyapatite, ion-exchange resins, zeolites, kaolin, nylon, phenolic polymers, polyaminostyrene, polyacrylamide, polypropylene, polymer hydrogels, sephadex, sepharose, silica gel, and PTFE.

When the enzyme is covalently bonded to the substrate the bonding agent may be, for example, imidocarbonate (for silica substrates), carbodiimide (for silica or nylon substrates) or imine (for silica or nylon substrates). Polymeric substrates such as polystyrene may be chemically modified with nitric acid to facilitate covalent bonding with amine groups in the enzyme.

Examples of suitable matrices include beads, fabrics, fibres, membranes, particulates, porous surfaces, rods and tubes.

Means for contacting the carbon dioxide-containing gas and the alkali metal carbonate solution are known. For example, the solution may be sprayed into a stream of the gas or the gas may be introduced into a vessel containing the solution or through which the solution flows.

The solution comprising alkali metal carbonate may be introduced into the vessel in which it is contacted with the carbon dioxide-containing gas at a single point or a plurality of points. The carbon dioxide-containing gas may be introduced into the vessel in which it is contacted with the solution comprising alkali metal carbonate at a single point or a plurality of points. Packed towers may be used to contact a gas phase and a liquid phase in order to promote dissolution of carbon dioxide into the liquid phase. Packings are used in packed towers to promote mass transfer between the gas and liquid phases. Packings include solid supports having different forms, geometries and sizes and comprise different materials. Known packings include Raschig rings, Berl saddles, Intalox saddles and Pall rings.

Catalyst, e.g. enzyme, in supported form may be attached to the walls of a vessel in which the gas and liquid phases are contacted, suspended in the liquid or attached to packings or to engineered internal solid structures in the vessel.

If it is necessary to recover supported catalyst, e.g. enzyme, from the solution before the second stage, recovery may be effected, for example, by filtration, a hydrocyclone or a magnetic separator if magnetic supporting particles are used, or by foaming and flotation in the case where a surface-active enzyme is used. Such recovery avoids contact with solid materials in the second stage.

The second solution in the process of the invention comprises carbonate and bicarbonate. The solution is contacted with the carbonatable material in a separate reactor in order to carbonate the mineral as an insoluble carbonate and regenerate alkali metal carbonate.

The carbonation reaction is most typically of the general type shown below:

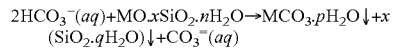

wherein M represents, for example calcium or magnesium, and x,n,p,q≥0 and x is preferably ≥0.01, for example ≥0.5

In certain cases, e.g. where the carbonatable material is strongly basic, an additional carbonation step of the following type may occur, producing hydroxide ions:

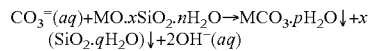

wherein the various symbols are as hereinbefore defined.

Conducting the carbonation reaction in a separate vessel has the advantage that no direct gas/solid contact is required. The reactor can therefore be smaller than would be required for such contact. The reactor can also, if desired, operate at a higher temperature than in the first stage of the process according to the invention. The reactor can be pressurised to avoid loss of water or carbon dioxide at a high temperature. The reaction may be carried out in an autoclave up to about 250° C. A pressure of up to about 200 atmospheres may be used. In an alternative embodiment a temperature of about 120° C. may be used. A pressure of about 3 atmospheres may be used.

The carbonation reaction can also be conducted at atmospheric pressure and/or at temperatures close to ambient. The reactor may then be large, for example a holding pond with a liner to contain the second solution and carbonatable material. The pond may be covered. The reaction may be allowed to proceed over an extended period of time to take into account low reaction rates.

The resulting regenerated alkali metal carbonate solution, (which may also contain hydroxide ions or bicarbonate ions, plus small amounts of impurity ions), may be recycled for further use in the process of the invention. The solid products in which carbon dioxide is chemically entrapped may be disposed of by sedimentation and/or filtration followed by drying to make a stable solid material that can be used as landfill, for example, in the remediation of mines or quarries. They may also be used to form a pumpable slurry for such forms of disposal. They may also be stabilized with a suitable binder, for example a cement, to make a product in shaped form, such as a construction product: for example, blocks, bricks, paving slabs and tiles. Such products in shaped form also constitute a feature of the invention.

The carbon dioxide-containing gas treated by the process of the invention may also comprise ash particles which may be removed before treatment, for example by known methods such as fabric filters or electrostatic precipitation. Alternatively, it may in some cases be beneficial for the ash to be collected by the solution used in the first step and thus be incorporated into the solid products referred to in the preceding paragraph.

The carbon dioxide-containing gas treated by the process of the invention may also comprise nitrogen oxides and/or sulphur oxides. Such gaseous oxides may if necessary be removed, or their concentrations reduced, by known methods prior to contact with the solution comprising carbonate ions used in the first step, so as to avoid possible deactivation of such a solution due to the formation of stable soluble anions such as sulfates and nitrates. Alternatively, the solution comprising carbonate ions may be used to scrub the gaseous oxides from the gas stream, but in such case a separate process may be added to remove the resulting stable soluble anions from the recycled carbonate solution.

A preferred method by which nitrogen oxides and/or sulphur oxides may be removed prior to contact with the carbonate solution of the first step comprises pre-treating, for example in a pre-scrubber, the carbon dioxide-containing gas comprising these gases with a suspension comprising an alkaline earth metal carbonate. The carbonate used may be a mineral carbonate produced by the process of the invention. The nitrogen oxides and/or sulphur oxides, if they were not removed prior to contact with the carbonate solution, could adversely affect the efficiency of the process of the invention by forming sulphates, sulphites, nitrates and nitrites, consuming alkalinity by replacing carbonate ions. Pre-treatment with an alkaline earth metal carbonate will instead form alkaline earth metal sulphates, sulphites, nitrates and nitrites which could potentially be used, for example, as cement additives.

It will be understood that solutions in the process of the invention are generally aqueous.

The following non-limiting Examples illustrate the invention.

EXAMPLE 1

Flue gas from a cement manufacturing plant to be treated contains about 14% of carbon dioxide, 9% oxygen and 12% water vapour by volume at 120° C., the remainder being principally nitrogen. Ash is removed from the flue gas by electrostatic precipitation. The gas is cooled to a temperature of 50° C. by pre-treatment with a slurry comprising calcium carbonate in a gas-scrubbing tower, so as to capture the majority of the sulfur oxides and nitrogen dioxide gases in the flue gas. The gas is then contacted with an aqueous solution comprising 5% by weight of sodium carbonate and 0.1% by weight of sodium hydroxide, having a pH of about 12.4. The solution also comprises a surfactant and a defoamer. The contact is effected in a tower containing packing to promote efficient absorption of carbon dioxide into the solution. The packing comprises on its surface immobilised carbonic anhydrase. The solution, at ambient temperature, is introduced at the top of the tower and absorbs carbon dioxide as it descends to form a solution comprising bicarbonate and carbonate which is extracted through an exit port at the bottom of the tower. Gas to be treated is introduced at the bottom of the tower: treated gas leaves the top of the tower via an exit port. The treated gas comprises 6% or less of carbon dioxide. The gas, as it progresses up the tower, is cooled by the descending solution. The temperature of the solution is monitored as it descends the tower in order to avoid thermal deactivation of the carbonic anhydrase.

The solution comprising bicarbonate and carbonate ions is introduced into the top of a covered holding pond (equipped with a liner) containing a finely-crushed metallurgical slag comprising calcium silicates. The slag particles in the pond react with the solution to precipitate calcium carbonate and amorphous hydrated silica. Reacted solution comprising sodium carbonate is withdrawn by pump from the bottom of the pond, and treated if necessary in a hydrocyclone to remove fine solids. Sodium hydroxide solution and/or sodium carbonate solution is then added to the recycled solution to bring it back to a pH of about 12.4 and ensure a sufficient liquid volume before returning it to the gas scrubbing tower as described above.

Once the solids in the holding pond have exhausted their capacity to react with bicarbonate ions, the excess liquid is pumped out for use in stage 1 and if necessary water added to flush out as much as possible of the remaining carbonate solution for recycling. The solids, containing chemically entrapped carbon dioxide, are allowed to settle and dewater naturally and may later be recovered for drying and use as a supplementary cementitious material in cement, or as a reactive filler in the manufacture of precast concrete products.

EXAMPLE 2

Flue gas from a cement manufacturing plant to be treated contains about 14% of carbon dioxide, 9% oxygen and 12% water vapour by volume at 120° C., the remainder being principally nitrogen. Ash is removed from the flue gas by electrostatic precipitation. The gas is cooled to a temperature of 50° C. by pre-treatment with a slurry comprising calcium carbonate in a gas-scrubbing tower, so as to capture the majority of the sulfur oxides and nitrogen dioxide gases in the flue gas. The gas is then contacted with an aqueous solution comprising 4% by weight of sodium carbonate and 1% by weight of sodium bicarbonate, having a pH of about 10.4. The solution also comprises a surfactant and a defoamer. The contact is effected in a tower containing packing to promote efficient absorption of carbon dioxide into the solution. The packing comprises on its surface immobilised carbonic anhydrase. The solution, at ambient temperature, is introduced at the top of the tower and absorbs carbon dioxide as it descends to form a solution comprising bicarbonate and carbonate which is extracted through an exit port at the bottom of the tower. Gas to be treated is introduced at the bottom of the tower: treated gas leaves the top of the tower via an exit port. The treated gas comprises 6% or less of carbon dioxide. The gas, as it progresses up the tower, is cooled by the descending solution. The temperature of the solution is monitored as it descends the tower in order to avoid thermal deactivation of the carbonic anhydrase.

The solution comprising bicarbonate and carbonate is introduced into a second, pressurised and heated reactor at a temperature of about 120° C. and a pressure of about 3 atmospheres where it is contacted with a brucite ($Mg(OH)_2$)-rich serpentine waste from the mining and processing of ultrabasic rock deposits. The bicarbonate reacts with the magnesium hydroxides and silicates in the waste to produce magnesium carbonates plus silica and other stable by-products.

The mixture is allowed to cool before separation of solid material containing chemically entrapped carbon dioxide and liquid comprising regenerated alkali metal carbonates for reuse in the first stage. Sodium hydroxide solution and/or sodium carbonate solution is then added to the recycled solution to bring it back to a pH of about 12.4 and ensure a sufficient liquid volume before returning it to the gas scrubbing tower as described above.

EXAMPLE 3

Flue gas from a cement manufacturing plant to be treated contains about 15% of carbon dioxide, 9% oxygen and 10% water vapour by volume at 120° C., the remainder being principally nitrogen. Ash is removed from the flue gas by electrostatic precipitation. The gas is contacted with an aqueous solution comprising 8% by weight of potassium carbonate and 2% by weight of potassium bicarbonate, together with 0.01% of a carbonic anhydrase enzyme stable at temperatures of up to 80° C. and modified with a hydrophobic group so as to behave as a non-foaming surfactant. The contact is effected in a spray tower. The solution, at ambient temperature, is introduced at the top of the tower and absorbs carbon dioxide as it descends to form a solution comprising about 7% potassium bicarbonate and 3% potassium carbonate. The solution becomes hot due to contact with the gas. It is extracted through an exit port at the bottom of the tower at a temperature of about 70° C. Gas to be treated is introduced at the bottom of the tower: treated gas leaves the top of the tower via an exit port. The treated gas comprises 7% or less of carbon dioxide. The gas, as it progresses up the tower, is cooled by the descending solution.

After extraction at the bottom of the gas-scrubber tower, the solution is treated with a foaming agent and led into a flotation cell into which a slip-stream of the flue gas is pumped through suitable nozzles to create a foam. The overflowing foam is enriched in enzyme and is collected for recycling to the liquid stream injected into the top of the spray tower. The remainder of the carbonated solution, now depleted in enzyme, is fed into the second reactor, which is a pressurized batch reactor operating at up to 200° C. and up to 150 atmospheres pressure, where it is contacted with finely-ground forsterite olivine powder. The bicarbonate-containing solution reacts with the olivine to form magnesium carbonate and silica gel according the following equation:

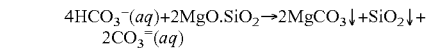

At the end of the reaction the solution, which now contains about 8% by weight of potassium carbonate and 2% by weight of potassium bicarbonate, is cooled in a heat exchanger and combined with the separated enzyme-rich solution from the flotation cell, plus additional "make-up" enzyme, potassium carbonate, water and defoaming agent if needed, and then fed back to the gas scrubber tower of the first step.

The invention claimed is:

1. A process for reducing the carbon dioxide concentration of a carbon dioxide-containing gas which process comprises, in a first stage, contacting the carbon dioxide-containing gas with a treating solution comprising an alkali metal carbonate and/or hydroxide and with a catalyst to promote the absorption of carbon dioxide to form a second solution comprising an alkali metal carbonate and bicarbonate and, in a second stage, contacting the second solution with a carbonatable silicate-containing material comprising an alkaline earth cation capable of forming an insoluble carbonate to produce silica and a solid carbonate comprising the alkaline earth cation and thus to regenerate a solution comprising alkali metal carbonate.

2. A process according to claim 1, wherein, after the alkali metal carbonate solution is regenerated, the alkali metal carbonate solution is reused in the treating solution.

3. A process according to claim 2, wherein an alkali metal hydroxide is added to the alkali metal carbonate solution to be reused.

4. A process according to claim 1, wherein the alkali metal is sodium or potassium.

5. A process according to claim 1, wherein the alkaline earth cation is calcium or magnesium.

6. A process according to claim 1, wherein the catalyst is a carbonic anhydrase enzyme.

7. A process according to claim 6, wherein, after formation of the second solution, enzyme is removed from the solution before the second stage.

8. A process according to claim 1, wherein the carbon dioxide-containing gas is a cement plant flue gas.

9. A process according to claim 1, wherein the carbon dioxide-containing gas is contacted with a solution comprising alkali metal carbonate and alkali metal hydroxide at high pH in the absence of catalyst and, when the hydroxide is converted to alkali metal carbonate and the carbonate forms bicarbonate, the pH of the solution being reduced, the solution having a reduced is contacted with catalyst.

10. A process according to claim 1, wherein the carbon dioxide-containing gas is pre-treated with a suspension comprising an alkaline earth metal carbonate.

* * * * *